United States Patent
Schneider

(10) Patent No.: US 12,110,919 B2
(45) Date of Patent: Oct. 8, 2024

(54) BIMETALLIC STAINLESS SCREW

(71) Applicant: Hilti Aktiengesellschaft, Schaan (LI)

(72) Inventor: Roland Schneider, Schlins (AT)

(73) Assignee: Hilti Aktiengesellschaft, Schaan (LI)

( * ) Notice: Subject to any disclaimer, the term of this patent is extended or adjusted under 35 U.S.C. 154(b) by 188 days.

(21) Appl. No.: 17/800,479

(22) PCT Filed: Feb. 9, 2021

(86) PCT No.: PCT/EP2021/053052
§ 371 (c)(1),
(2) Date: Aug. 17, 2022

(87) PCT Pub. No.: WO2021/165094
PCT Pub. Date: Aug. 26, 2021

(65) Prior Publication Data
US 2023/0077013 A1 Mar. 9, 2023

(30) Foreign Application Priority Data
Feb. 18, 2020 (EP) .................................... 20158000

(51) Int. Cl.
*F16B 25/00* (2006.01)

(52) U.S. Cl.
CPC ...... *F16B 25/0026* (2013.01); *F16B 25/0073* (2013.01); *F16B 25/0094* (2013.01); *F16B 25/00* (2013.01)

(58) Field of Classification Search
CPC .. F16B 25/00; F16B 25/0026; F16B 25/0073; F16B 25/0094; F16B 33/008; F16B 35/00; F16B 35/065

USPC ................. 411/378, 383, 411, 424, 900–901
See application file for complete search history.

(56) References Cited

U.S. PATENT DOCUMENTS

| | | | |
|---|---|---|---|
| 7,040,850 B2 * | 5/2006 | Gaudron | F16B 25/0073 411/311 |
| 8,182,186 B2 | 5/2012 | Huber et al. | |
| 8,616,815 B2 * | 12/2013 | Cooper | F16B 35/041 411/361 |
| 10,823,219 B2 * | 11/2020 | Hakenholt | F16B 25/0094 |
| 2003/0123952 A1 * | 7/2003 | Unsworth | F16B 25/0094 411/412 |

(Continued)

FOREIGN PATENT DOCUMENTS

| | | |
|---|---|---|
| DE | 10 2010 063 682 A1 | 6/2012 |
| WO | WO 2012/084385 A1 | 6/2012 |

(Continued)

OTHER PUBLICATIONS

PCT/EP2021/053052, International Search Report dated Mar. 17, 2021 (Two (2) pages).

*Primary Examiner* — Roberta S Delisle
(74) *Attorney, Agent, or Firm* — Crowell & Moring LLP

(57) ABSTRACT

A screw includes a shank having a tip, a rear end which is disposed opposite the tip, and a longitudinal axis which extends through the tip and through the rear end. The shank consists of a first steel material. A screw thread helix is disposed on the shank and protrudes from the shank. The screw thread helix consists of a second steel material that is different from the first steel material. Both the first steel material and the second steel material are stainless steels.

3 Claims, 1 Drawing Sheet

(56) References Cited

U.S. PATENT DOCUMENTS

| | | | |
|---|---|---|---|
| 2003/0190213 A1* | 10/2003 | Lutkus | F16B 37/12 |
| | | | 411/178 |
| 2010/0216560 A1 | 8/2010 | Huber et al. | |
| 2010/0290858 A1 | 11/2010 | Hettich et al. | |
| 2011/0142569 A1 | 6/2011 | Hagel et al. | |
| 2011/0286814 A1* | 11/2011 | Hettich | F16B 25/10 |
| | | | 411/386 |
| 2018/0283435 A1* | 10/2018 | Hakenholt | F16B 25/0026 |
| 2020/0063231 A1 | 2/2020 | Schneider et al. | |
| 2021/0054866 A1 | 2/2021 | Pol et al. | |

FOREIGN PATENT DOCUMENTS

| | | |
|---|---|---|
| WO | WO 2019/002044 A1 | 1/2019 |
| WO | WO 2019/170507 A1 | 9/2019 |

* cited by examiner

BIMETALLIC STAINLESS SCREW

BACKGROUND AND SUMMARY OF THE INVENTION

The invention relates to a screw. The screw comprises a shank having a tip, a rear end, which is located opposite the tip, and a longitudinal axis, which extends through the tip and through the rear end, wherein the shank consists of a first steel material, and further comprises a screw thread helix, which is arranged on the shank and which protrudes from the shank, wherein the screw thread helix consists of a second steel material that is different from the first steel material.

Concrete screws for outdoor applications should often fulfil requirements including:
high resistance to concrete failure,
efficient cutting capability of the internal concrete thread, in particular also within reinforcement elements inside the concrete, by the screw,
high resistance to steel failure during installation and loading of the screw,
high resistance against brittle failure such as hydrogen assisted cracking,
high durability and resistance against corrosion, and
efficient manufacturing at low cost.

However, when specifying steel materials for concrete screws, dilemma might arise due to material properties which are contradictory in view of these requirements. For example, the level of hardenability (which can be important for installation and load performance) may be limited by an increase of the risk of hydrogen embrittlement, and corrosion resistance may be limited and contradictory to high hardness.

Several material concepts exist for addressing this issue in concrete screws. WO 2019/002044 A1, for example, describes a screw which is, completely, made of martensitic stainless steel of a grade that offers both corrosion resistance and hardenability, in particular due to the special chemical composition of the steel in combination with a nitriding heat treatment.

Other concepts combine different materials within a single screw.

US 2010/0216560A1 discloses concrete screws that comprise a screw body made of (austenitic) stainless steel, on which hard metal cutting elements, for example welded to the screw body, are provided.

WO 2019/170507A1 discloses an example of an axially bimetallic screw, in which the material of a tip section of the screw differs from the material of the remainder of the screw.

US 2011/0142569A1 describes screw anchors which are mostly monolithic, with an exception of the foremost part of the screw thread, which is a separate part.

US 2010/0290858 A1 discloses screws comprising a shank-like element and a separate screw thread helix attached thereto, wherein, depending on the intended use, the separate screw thread helix can comprise two separate parts. In the event that a corrosive attack is not to be expected, the shank-like element can consist of common construction steel and the screw thread helix can consist of a hardenable steel comprising a high carbon content. In the event that provision is made for use of the screw anchor in the outside, where corrosive attack is to be expected due to changing environmental influences, the shank-like element can consist of stainless steel, and the screw thread helix can be embodied in two parts, namely comprising a cutting part, which consists of a steel comprising a high carbon content, and comprising a supporting part consisting of a stainless spring steel.

WO 2012/084385 A1/DE 10 2010 063 682 A1 discloses another screw anchor with a separate cutting helix. The shank is made from malleable steel, which is not heat-treated. The cutting helix can consist of hardened stainless steel, having a surface hardness of about 600 HV. As an alternative, it is proposed to use galvanized carbon steel.

It is an object of the invention to provide a screw that is particular versatile, is particularly easy and/or economical to manufacture and/or can provide particularly good performance and/or reliability.

According to the invention, both the first steel material and the second steel material are stainless steels.

Accordingly, the screw of invention comprises a shank and a screw thread helix. These two elements are both made of stainless steels, however of different steel grade. This design can be considered as "radially bimetal". The distinct design of shank and screw thread helix, respectively, allows the utilization of different stainless-steel grades for shank and screw thread helix, respectively, which are optimized for individual requirements of these components. Therefore, the requirements mentioned above can be achieved in a particularly equal manner, i.e., without too much compromise on particular requirements, in particular on load bearing and cutting function.

The shank is an elongate element. Preferably, it can have, generally, rotational symmetry, in particular with respect to any angle, with respect to the longitudinal axis. For example, the shank can be generally circular cylindrical. In particular when the screw is a concrete screw, the tip can be blunt. However, it could also be pointed. The tip is that end which is intended to be inserted first into the borehole. A head can be attached to the rear end of the shank. The shank could be hollow but preferentially, it is massive.

The screw thread helix constitutes an external screw thread. The screw thread helix is provided on the circumferential surface of the shank and winds around the shank. The screw thread helix protrudes radially from the shank so as to engage into an internal screw thread groove, preferably into an internal screw thread groove which is, at least partly, cut by the screw thread helix itself. Preferably, the screw is a concrete screw, in which case the internal screw thread groove in which the screw thread helix is intended to engage can be provided in a concrete substrate, and in which case the screw thread helix can be configured to cut the internal screw thread groove in the concrete substrate, at least partly. Preferably, there are no additional cutting elements provided on the screw thread helix.

The screw thread helix and the shank, respectively, are distinct, as they consist of different materials. In particular, these elements can be manufactured separately and joined thereafter to give the screw. However, the screw thread helix is arranged on the shank so as to transfer tensile load, in particular rearwardly directed tensile load, from the shank into the screw thread helix, which can be achieved by geometric engagement between the shank and the screw thread helix. In particular, the screw thread helix can be connected to the shank.

The screw thread helix and/or the shank can have at least one metallic or non-metallic coating and/or at least one metallic or non-metallic inlay.

Throughout this document, the terms "axially", "longitudinally", "radially" and "circumferentially" should refer, in particular, to the longitudinal axis of the shank. Rearwards is a direction parallel to the longitudinal axis of the shank, pointing from the tip to the rear end.

It is particular advantageous that the second steel material has a Vickers hardness between 550 HV10 and 800 HV10, preferably between 650 HV10 and 750 HV10, wherein Vickers hardness is in particular according to ISO 6507. Accordingly, the second steel material, which is used for the screw thread helix, has a relatively high hardness, which also entails a relatively high proneness to (hydrogen assisted) brittle failure. However, it was—surprisingly—found, that the "radially bimetallic" design of the inventive screw allows to tolerate this proneness, since it can easily be confined to the screw thread helix, which provides capability for load redistribution after any potential load-path failures. The main load path is provided by the shank, which is not affected by the choice of material for the screw thread helix. In contrast, loads transferred via the screw thread helix from the shank to the surrounding substrate are distributed along the entire screw thread helix length. If that load path is interrupted due to any potential (but still unlikely) local failure of the screw thread helix, the residual loads will be redistributed to the remaining and intact sections of the screw thread helix, without significant effect to the load path. In other word, potential fracturing of the screw thread helix due to brittle failure will not significantly affect load bearing capacity and can thus be tolerated. Accordingly, the inventive choice of Vickers hardness can provide particularly good cutting performance at low expense, without significant compromise on load bearing capacity and/or reliability.

Preferably, the screw thread helix spans at least 33%, preferably at least 40% or 50%, of the length of the shank. Thus, the longitudinal overlap between the screw thread helix and the shank is at least 33%, 40% or 50%, respectively, of the length of the shank, with the length of the shank measured in the longitudinal direction. Accordingly, the screw thread helix has significant longitudinal extension along the shank, and thus, it can preferably be considered the main thread of the screw. This allows to achieve particularly high embedment depth with particularly good thread reliability, further improving performance.

According to a further preferred embodiment of the invention, the first steel material, i.e., the shank's steel material, has a Vickers hardness below 440 HV10. As a consequence, the resistance to (hydrogen assisted) brittle failure of the shank is relatively high, leading to particularly good reliability in the primary load path provided by the shank.

As already mentioned above, the screw is preferably a concrete screw, i.e., the screw, in particular the screw thread helix thereof, is able to, at least partly, cut its mating internal screw thread groove in a concrete substrate. In particular, a ratio of the outer thread diameter of the screw thread helix to the pitch of the screw thread helix can be between 1 and 2, in particular between 1.2 and 1.6, at least in some regions of the screw thread helix, more preferably at least in some regions of the screw thread helix located near the tip. These are typical dimensions for concrete screws.

The invention is explained in greater detail below with reference to preferred exemplary embodiments, which are depicted schematically in the accompanying drawings. Individual features of the exemplary embodiments presented below can be implemented either individually or in any combination within the scope of the present invention.

DETAILED DESCRIPTION OF THE DRAWINGS

Figure 1:
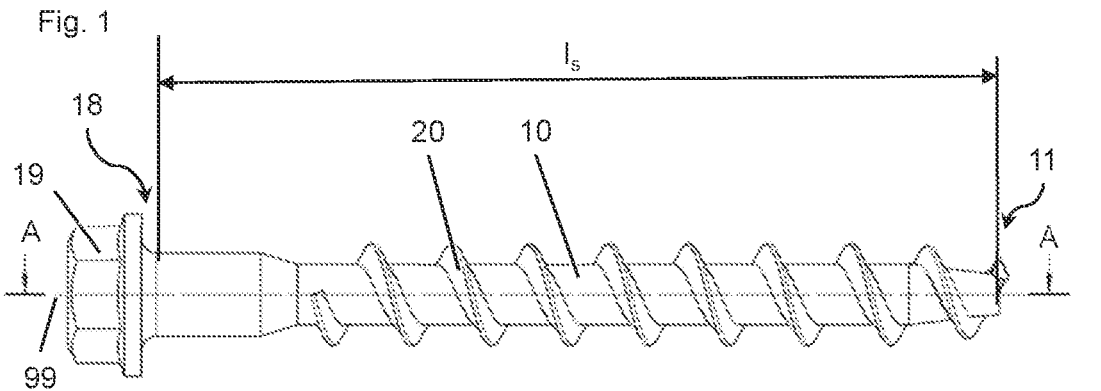
FIG. 1 is a side view of a screw.
Figure 2:
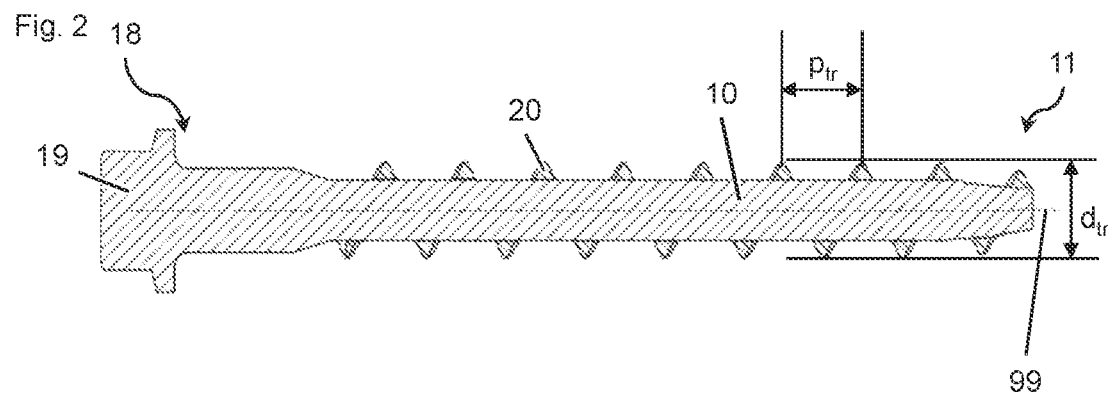
FIG. 2 is a sectional view, according to A-A in FIG. 1, of the screw of FIG. 1.
Figure 3:
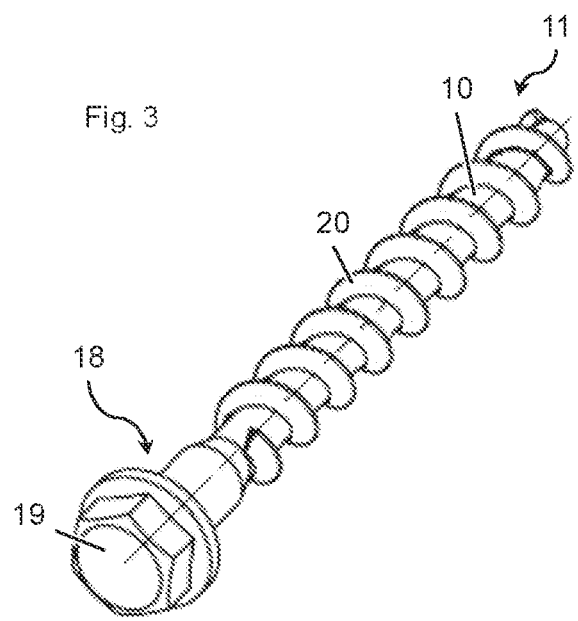
FIG. 3 is an isometric view of the screw of FIG. 1.

The figures show an embodiment of a screw. The screw comprises a shank 10 having a tip 11 at its front end, and, at its opposite other end, a rear end 18. The tip 11 is that end of the shank 10 which is intended to be inserted first into a borehole. The longitudinal axis 99 of the shank 10 extends through the tip 11 and through the rear end 18.

The screw further comprises a drive 19 for transmitting torque to the shank 10 for rotating the shank 10 around the longitudinal axis 99 of the shank 10 for installing the screw. In the present embodiment, the drive 19 is a hex drive head connected to the rear end 18. However, this is an example only, and any type of drive could be used, such as a slotted drive, a cruciform drive, a lobular drive, an internal polygon drive, an external polygon drive or a special drive.

The screw furthermore comprises a screw thread helix 20, which is connected to the shank 10 so as to wind around the shank 10. The screw thread helix 20 and the shank 10, respectively, are materially distinct elements. Whereas both the screw thread helix 20 and the shank 10 consist of stainless steel, the steel grade used for these respective elements is different.

In the present embodiment, the screw thread helix 20 spans, longitudinally (i.e., in the direction parallel to the longitudinal axis 99), approximately 80% of the length $l_s$ of the shank 10. The screw thread helix 20 thus forms a main thread of the screw. In the present embodiment, no additional helical elements are provided on the screw.

The screw thread helix 20 has an outer thread diameter $d_{tr}$. At least near the tip 11 of the non-installed screw, a ratio of the outer thread diameter $d_{tr}$ of the screw thread helix 20 to the pitch $p_{tr}$ of the screw thread helix 20 is between 1 and 2, in particular between 1.2 and 1.6.

The first steel material, i.e., the material of the shank 10, has a Vickers hardness below 440 HV10, whereas the second steel material, i.e., the material of the screw thread helix 20, has a Vickers hardness between 550 HV10 and 800 HV10, preferably between 650 HV10 and 750 HV10, in particular both according to ISO 6507.

The first steel material can for example be an austenitic (e.g., 1.4404, 1.4301, 1.4529, or similar), a duplex (e.g., 1.4062, 1.4162, 1.4362, 1.4410, 1.4509, or similar), a ferritic (e.g., 1.4105, 1.4113, 1.4521, or similar) or a PH stainless steel (e.g., 15-5 PH or similar).

The second steel material can for example be an austenitic (e.g., 1.4565/1.4566, 1.3808, or similar), a martensitic (e.g., 1.4108, 1.4109, 1.4116, 1.4122, the steel grade described in WO 2012/084385 A1) or a PH stainless steel (e.g., 17-7 PH).

The invention claimed is:
1. A concrete screw for an outdoor application, comprising:
a shank having a tip, a rear end which is disposed opposite the tip, and a longitudinal axis which extends through the tip and through the rear end, wherein the shank consists of a first steel material; and
a screw thread helix which is disposed on the shank and which protrudes from the shank, wherein the screw thread helix consists of a second steel material that is different from the first steel material;

wherein both the first steel material and the second steel material are stainless steels of respective different grades;

wherein the first steel material has a Vickers hardness below 440 HV10;

wherein the second steel material has a Vickers hardness between 550 HV10 and 800 HV10.

2. The screw according to claim 1, wherein the screw thread helix spans at least 40% of a length of the shank.

3. The screw according to claim 1, wherein a ratio of an outer thread diameter of the screw thread helix to a pitch of the screw thread helix is between 1 and 2 at least in regions of the screw thread helix.

\* \* \* \* \*